(12) United States Patent
Vora et al.

(10) Patent No.: US 7,187,772 B2
(45) Date of Patent: Mar. 6, 2007

(54) ANONYMOUS TRANSACTIONS BASED ON DISTRIBUTED PROCESSING

(75) Inventors: Poorvi L. Vora, Corvallis, OR (US); Verna E. Knapp, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 10/143,081

(22) Filed: May 10, 2002

(65) Prior Publication Data

US 2003/0048906 A1   Mar. 13, 2003

Related U.S. Application Data

(63) Continuation-in-part of application No. 09/944,739, filed on Aug. 31, 2001, and a continuation-in-part of application No. 09/976,637, filed on Oct. 12, 2001, and a continuation-in-part of application No. 10/099,446, filed on Mar. 15, 2002, and a continuation-in-part of application No. 10/098,261, filed on Mar. 15, 2002, and a continuation-in-part of application No. 10/121,563, filed on Apr. 12, 2002.

(51) Int. Cl.
*H04L 9/00*   (2006.01)

(52) U.S. Cl. ............... 380/277; 380/278; 705/74

(58) Field of Classification Search ........ 380/277–285; 705/74; 713/163, 171, 175–176
See application file for complete search history.

(56) References Cited

U.S. PATENT DOCUMENTS

| 5,315,658 | A | 5/1994 | Micali |
| 5,764,767 | A | 6/1998 | Beimel et al. |
| 6,810,122 | B1 * | 10/2004 | Miyazaki et al. ............. 380/30 |

FOREIGN PATENT DOCUMENTS

| GB | 2155675 A | 9/1985 |
| GB | 2365729 A | 2/2002 |
| WO | 97/24833 | 7/1997 |

* cited by examiner

*Primary Examiner*—Hosuk Song

(57) ABSTRACT

An entity that desires to engage in anonymous transactions first generates a transaction identification that does not uniquely identify the entity. Additionally, the entity splits an entity identification uniquely associated with the entity into a plurality of secret shares and thereafter sends the transaction identification and the plurality of secret shares to a plurality of shareholders. Subsequently, anonymous transactions on behalf of the entity may be directly conducted by the shareholders based in part upon the plurality of secret shares. In one embodiment of the present invention, the entity identification comprises a public key uniquely assigned to the entity.

60 Claims, 5 Drawing Sheets

ANONYMOUS TRANSACTIONS BASED ON DISTRIBUTED PROCESSING

CROSS-REFERENCE TO RELATED APPLICATIONS

The instant application is a continuation-in-part of prior U.S. patent application Ser. No. 09/944,739, entitled ANONYMOUS ACQUISITION OF DIGITAL PRODUCTS BASED ON SECRET SPLITTING, filed Aug. 31, 2001; prior U.S. patent application Ser. No. 09/976,637, entitled ANONYMOUS RECOMMENDATION TECHNIQUE, filed Oct. 12, 2001; prior U.S. patent application Ser. No. 10/099,446, entitled ANONYMOUS PROCESSING OF USAGE RIGHTS WITH VARIABLE DEGREES OF PRIVACY AND ACCURACY, filed Mar. 15, 2002; prior U.S. patent application Ser. No. 10/098,261, entitled ANONYMOUS RECOMMENDATION TECHNIQUE WITH VARIABLE DEGREES OF PRIVACY AND ACCURACY, filed Mar. 15, 2002, all by Vora et al., and prior U.S. patent application Ser. No. 10/121,563, entitled ANONYMOUS TRANSACTIONS BETWEEN AN ENTITY AND A PROVIDER, filed Apr. 12, 2002 by Knapp, the teachings of which prior applications are incorporated herein by this reference.

BACKGROUND OF THE INVENTION

Electronic commerce is increasingly becoming a part of everyday life. In particular, the rapid growth of the Internet and World Wide Web has lead to a corresponding increase in the ability to acquire goods and services remotely.

The desire for privacy has lead to an increase in a number of services that maintain in secret the identity of users of those services. For example, a variety of anonymous e-mail services are currently available whereby recipients of an e-mail are not able to associate the sending entity's identification with the e-mail. While such services help maintain privacy, they also provide a means by which malicious parties may act more freely. Furthermore, in a purchase transaction, such anonymity could be used to perpetuate fraud against vendors. In prior U.S. patent applications having Ser. Nos. 09/944,739; 09/976,637; 10/099,446 and 10/098,261 we described systems for conducting transactions, obtaining recommendations and verifying usage rights in an anonymous fashion. While these prior applications teach various advances in the art, they are each premised on a centralized implementation. That is, in each prior application, a third party "anonymity service" is provided to implement the functionality needed to maintain anonymity. However, it is recognized that, in some situations, a distributed implementation may be preferred. Therefore, a need exists for a distributed technique that provides enhanced privacy during e-commerce transactions, but that also provides a degree of accountability such that the opportunity for malicious acts is minimized.

SUMMARY OF THE INVENTION

The present invention provides a technique for engaging in anonymous transactions in which the processing necessary to maintain anonymity is implemented in a distributed fashion. In one embodiment of the present invention, an entity that desires to engage in anonymous transactions first generates a transaction identification that does not uniquely identify the entity. Additionally, the entity splits an entity identification uniquely associated with the entity into a plurality of secret shares and thereafter sends the transaction identification and the plurality of secret shares to a plurality of shareholders. Subsequently, anonymous transactions on behalf of the entity may be directly conducted by the shareholders based in part upon the plurality of secret shares.

DETAILED DESCRIPTION OF THE PREFERRED EMBODIMENT

Figure 1:
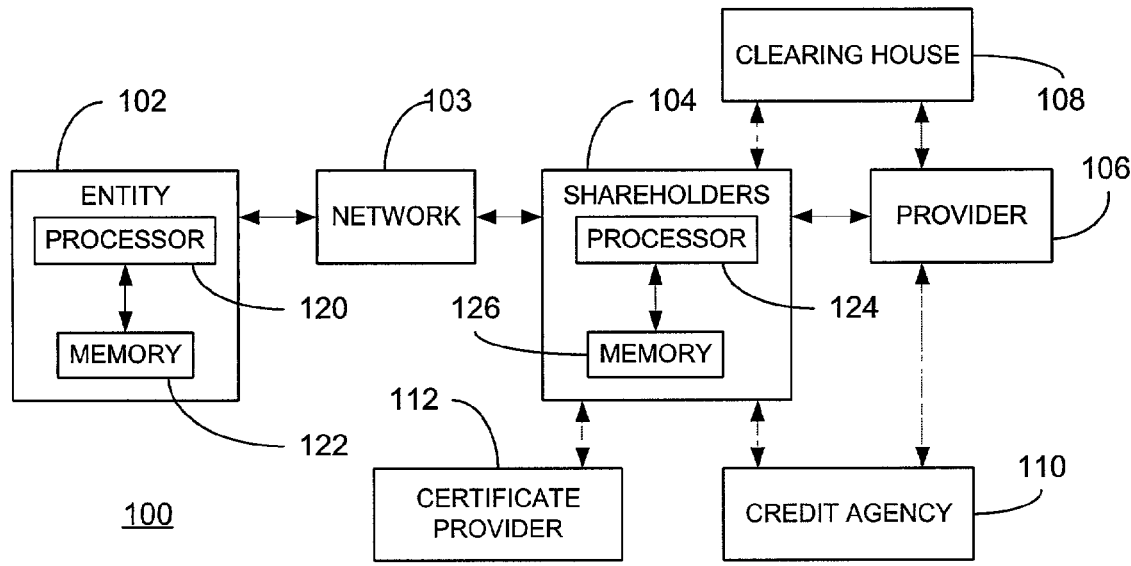
FIG. 1 is a block diagram illustrating an arrangement that may be used for electronic commerce in accordance with an embodiment of the present invention.

The present invention may be more readily described with reference to FIGS. 1–7. Referring now to FIG. 1, there is illustrated a block diagram of a system 100 in accordance with the present invention. In particular, an entity 102 communicates with a plurality of shareholders 104 via a communication network 103. In a preferred embodiment, the communication network 103 comprises a public network such as the Internet or World Wide Web. However, it is understood that private networks (e.g., intranets, extranets, virtual private networks, etc.) may also be used, either alone or in combination with public networks.

In the context of the present invention, each entity 102 (one shown) may comprise any individual or organization capable of acquiring a digital product or goods from a provider 106, or capable of receiving recommendations based on past transactions. In practice, each entity 102 communicates with the shareholders 104 as a computer implementing a network communication program, such as a browser or the like. As shown in FIG. 1, each entity preferably comprises a processor 120 in communication with a memory 122 as typically found in personal computers and the like. Note that the present invention is not limited by the location of the entity 102, i.e., it may comprise, for example, a personal computer residing at an individual's residence or a kiosk-type terminal situated at a merchant's place of business. Additionally note that, as used herein, the term "entity" encompasses not only the platform used to provide communications and processing, but also a user or user thereof.

As described in greater detail below, each of the shareholders 104 is provided with a secret share which, by itself, does not enable an individual shareholder to reconstruct a secret regarding an entity 102, e.g., an entity identification. In one embodiment of the present invention, the entity 102 may select different groupings of shareholders 104 at will. For example, when purchasing goods of one type, a first set of shareholders may be employed, whereas transactions involving goods of another type may be implemented through the use of a second set of shareholders, also chosen by the entity, that may or may not have common shareholders relative to the first set. Furthermore, the number of shareholders in each set of shareholders can be equal, although this is not a requirement. In any event, each shareholder is capable of receiving secret shares from the entity 102. To this end, each shareholder preferably comprises a computer-implemented device capable of communicating with the entity 102 via the communication network 103. Once again, this is illustrated by the presence of a processor 124 coupled to memory 126 in a conventional manner. For example, in one embodiment of the present invention, each shareholder 104 is implemented using a suitably programmed web server or servers. Because secret sharing schemes are vulnerable to the extent that separate shareholders could collaborate to ascertain the secret in their possession, it is advantageous to maintain the identity of each shareholder in confidence from the other shareholders. Furthermore, it is preferred to select the shareholders such that they have an inherent reason not to collaborate with each other. For example, shareholders in possession of the secret shares corresponding to a single secret may comprise competitors in a given industry. Such competitors are inherently unlikely or unwilling to share information with each other. Additionally, the shareholders may comprise a privacy organization that is dedicated to advocating privacy in electronic commerce, and therefore unlikely to collaborate with other shareholders. Further still, the entity 102 may comprise one of the shareholders, or the shareholders 107 may be known to the entity 102, such as family members or friends.

As shown in FIG. 1, one or more of the shareholders 104 is in communication with a variety of entities that may be needed to fulfill an electronic transaction, including one or more providers 106, a clearing house 108, a credit agency 110 and/or a certificate provider 112. Each of these entities 106–112 preferably comprises a suitably programmed computer-implemented platform capable of communicating with the one or more shareholders 104 via an appropriate network or other communication link.

The provider 106 may comprise any individual or organization that provides digital products or goods via a communication network. In the context of the present invention, digital products or goods comprise anything capable of delivery via a communication network. For example, digital products may include downloadable software or digital data such as text, audio, video or images. Those having ordinary skill in the art will recognize that other types of digital products may be used in conjunction with the present invention, and the present invention is not limited in this regard.

The clearing house 108 comprises a computer-implemented service used to credit an account of the provider 106 in those instances in which the transaction between the entity 102 and the provider 106 is a purchase of goods. The credit agency 110 comprises a computer-implemented credit verification service used when a digital product is being purchased by the entity 102. Together, the clearing house 108, provider 106 and credit agency 110 allow one or more of the shareholders 104 to anonymously fulfill a purchase request from the entity 102, as described below. Of course, some transactions may not require payment by the entity, in which case the clearing house 108 and credit agency 110 do not need to be employed when fulfilling the transaction.

The certificate provider 112 comprises a computer-implemented service used to verify an entity's public key in those embodiments in which a public key is used. In current implementations, public keys are often accompanied by a so-called public key certificate used to verify the legitimacy of the public key. A public key certificate is typically digitally signed using the private key of the certificate provider, so that the legitimacy of the entity's public key can be checked using the public key of the certificate provider. The certificate typically states that "Public Key X is the public key of Party Y." To check if a certain entity is indeed Party Y, and therefore legitimately provided a public key to a recipient, the recipient can send the entity a random number encrypted using the received public key (i.e. encrypt a random number using what is represented to be Public Key X) and see if the entity can decrypt it. If the entity successfully decrypts, it necessarily follows that the entity possesses the private key that only Party Y would possess. This latter step of using an encrypted random number is a typical challenge protocol and is not necessary to establish the association of Public Key X with Party Y. It is, however, necessary when one needs to determine if the party from whom a public key is received is indeed associated with that public key. In one embodiment of the present invention, discussed in further detail below, public keys may be used for a dual purpose: first, to act as a unique identifier to the entity to which it has been issued and, second, for use in encrypting information by the shareholders. Because the public keys are provided to the shareholders in a distributed fashion such that no one shareholder possesses a complete version of the public key, the certificate provider 112 allows shareholders to collectively verify the public key in their possession by submitting their respective portions of the public key to the shareholder, along with the accompanying digital certificate, to verify the legitimacy of the public key in the shareholders' collective possession.

Figure 2:
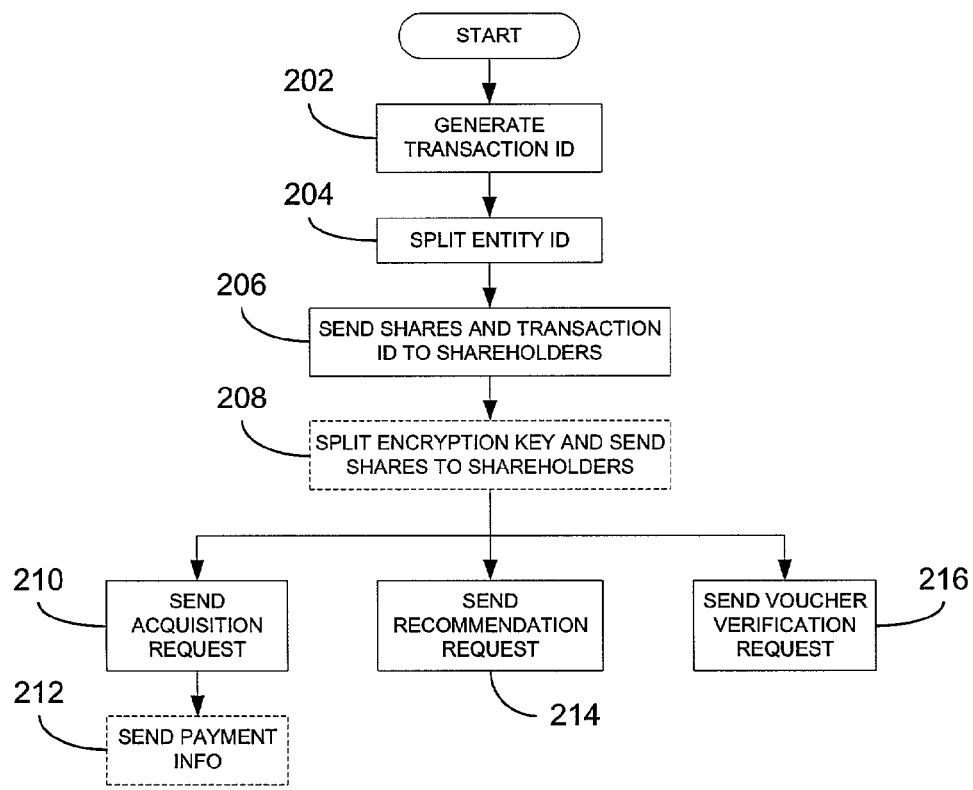
FIG. 2 is a flow chart illustrating a method for an entity in accordance with one embodiment of the present invention.

Referring now to FIG. 2, a flowchart is shown illustrating operation of an entity in accordance with an embodiment of the present invention. In particular, the functionality shown in FIG. 2 is preferably implemented using stored software algorithms and the like operating, when necessary, in conjunction with necessary hardware, for example, data input/output interfaces. Thus, at block 202, in response to recognizing an entity's desire to engage in a transaction (e.g., through the detection of a user's input such as a menu selection, button press, etc.), the entity generates a transaction identification. In a presently preferred embodiment, the transaction identification comprises a random or pseudo-random number generated by the entity in accordance with known techniques. The length of the generated number may be made as long as desired in order to minimize the likelihood of collisions with other transaction identifications generated by the same or other entities. Furthermore, other data may be appended to the generated number, such as the current date and/or time when the number is generated in order to further ensure uniqueness of the transaction identification. Regardless, the transaction identification is characterized in part in that it does not identify the entity in any way, but merely serves to distinguish this one transaction from other transactions.

At block 204, the entity uses a cryptographic secret splitting technique to split an entity identification corresponding to the entity into a plurality of secret shares. Such secret splitting techniques are well known in the art. In essence, a secret splitting technique takes a secret and divides it up into pieces such that each piece by itself does not allow a holder of that piece to reconstruct the secret. However, a holder in possession of all of the pieces is able to reconstruct the secret.

As an example of secret sharing, assume that a party A wishes to split a secret S into three shares that will be subsequently given to parties B, C and D. In accordance with a preferred embodiment of the present invention, further assume that the secret S is represented as a string of bits having length M. First, A generates two random bit strings, X and Y, each of length M. (Techniques for generating random bit strings are well known in the art of cryptography and are therefore not described in detail herein.) The secret S is thereafter exclusive-OR'd with X and Y to provide a new bit string Z, also of length M:

$$Z = S \oplus X \oplus Y \qquad \text{Eq. 1.}$$

Thereafter, A provides Z, X and Y (the secret shares) to, for example, B, C and D (the shareholders), respectively. Note that none of B, C or D is able to reconstruct the secret S based solely on their respective share (Z, X or Y). To the contrary, the only way to reconstruct the secret is to combine the secret shares once again:

$$S = Z \oplus X \oplus Y \qquad \text{Eq. 2.}$$

While this is a simple example, it illustrates the basic concept and implementation of secret splitting. For example, a larger number of shareholders may be employed by simply generating additional random bit strings to combine with the secret. In one embodiment of the present invention, as the previous example illustrates, the secret sharing scheme employed reduces the secret to a linear combination of shares. Another example of such a scheme is the so-called Rabin's scheme as known in the art. One publication teaching a variety of cryptographic secret splitting techniques is "Applied Cryptography" by Bruce Schneier (John Marley & Sons, 1996), the teachings of which are incorporated herein by this reference. Referring back to FIG. 2, the number of secret shares provided at block 204 for each secret is a matter of design choice. Furthermore, the number of secret shares for one secret does not necessarily have to be equal to the number of secret shares for another secret.

As noted above, the secret that is split at block 204 comprises the entity's identification, which identification is preferably unique to the entity. In practice, virtually any string of data may be used to identify the entity. However, in a presently preferred embodiment, a public key issued to the entity serves as the entity identification. The generation and use of public keys is well known in the art and need not be described in greater detail herein. As described in greater detail below, certain types of public keys (e.g., those used by the so-called RSA scheme) may be used in a distributed fashion when encrypting and decrypting data. That is, if the public key is split into a variety of shares, each share may be used to encrypt/decrypt data and the resulting partially encrypted/decrypted data combined together to produce encrypted/decrypted data equivalent to what would result if the public key had been used in its entirety in the first instance. Stated in a formulaic manner, $$e(\text{key, asset}) = e(A, \text{asset}) \times e(B, \text{asset}) = e(A+B, \text{asset}) \qquad \text{Eq. 3.}$$

where "key" is a public key, "asset" is the data being encrypted, e(key, asset) is the function of encrypting/decrypting the asset with the key, "A" is a first secret share and "B" is a second secret share both derived from the splitting of the public key such that key=A+B (i.e., the key is a linear combination of the secret shares). Note that only two secret shares have been denoted in the example for convenience; those having ordinary skill in the art will recognize (a) that a greater number of shares is possible and, in most applications, preferable, and (b) that the key may be represented as a weighted sum of the shares rather than as a direct sum of the shares. This latter characteristic may be stated in a formulaic manner as:

$$\text{key} = \sum_i c_i S_i \Rightarrow e(\text{key, asset}) = \prod_i e(S_i, \text{asset})^{c_i}. \qquad \text{Eq. 4}$$

where $c_i$ is a weighting factor corresponding to the i'th secret share, $S_i$. Cryptosystems possessing this property are particularly useful in the context of the present invention in that they allow for distributed cryptographic processing in addition to their identification function.

Regardless, after the secret shares have been created, they are sent by the entity to a plurality of shareholders at block 206. While the secret shares could be sent to the shareholders in encrypted form in order to enhance security, the secret shares are sent unencrypted in another embodiment. In effect, the shareholders serve as long-term storage for each secret share. The length of time each shareholder will store a corresponding secret share is a matter of design choice and may be dictated, for example, by legal requirements setting the length of time documentation regarding a transaction is to be stored. So that each secret share can be later recalled by the entity as needed, or so that each shareholder may reference its corresponding secret share later on, the entity additionally provides the transaction identification to each respective shareholder. The shareholders associatively store their respective secret shares with the transaction identification. Although not illustrated in FIG. 2, the entity associatively stores the transaction identification and identifications of the shareholders for each secret. That is, the transaction identification is associated with the identifications of the shareholders in possession of secret shares corresponding to that transaction. The transaction identification and shareholder identifications stored by the entity are the only information used by the entity to reconstruct secrets corresponding to a given transaction, if at all. In this manner, the chances that an adverse party, such as a hacker, discovering an entity's identification, the identification of any providers with whom the entity is dealing with or the identification of any digital products acquired by that entity are substantially minimized. Note also that different entity identifications, and therefore different secret shares, may be used as between different transactions.

In the case where something other than a public key is used as the entity identification, the processing of block 208 may be optionally performed. As previously noted, a public key may be used for identification as well as cryptographic purposes in the distributed environment of the present invention. However, it may be desirable or necessary to keep these functions separate. In that case, at block 208, an encryption key, separate and apart from the entity identification, is split using the above-described secret splitting techniques and the resulting encryption key secret shares sent to the respective shareholders, with or without the transaction identification. Once again, the encryption key used at block 208 should be susceptible to distributed operations as described above, i.e., the cumulative effect by shareholders using their separate shares of the encryption key is equivalent to use of the entire encryption key itself.

At this point, the entity has established a basis upon which a variety of transactions may be carried out. Examples of these various transactions are further illustrated in FIG. 2 at blocks 210–216, in particular, initiating an acquisition of goods, initiating a recommendation request or obtaining a voucher or usage rights verification. Referring now to an acquisition of goods, the entity sends an acquisition request to one or more of the shareholders at block 210. As described in U.S. patent application Ser. No. 09/944,739 incorporated by reference above, the acquisition request may comprise a purchase request in those instances in which the goods are offered for sale by a provider. Alternatively, the acquisition request may comprise a request for a free digital product such as shareware or a trial software package as are known in the art. Additionally, the acquisition request may comprise a plurality of acquisition-related variables necessary for an entity to acquire the goods. In the context of the present invention, the acquisition-related variables may comprise the transaction identification, identifications of a provider of the goods as well as the goods themselves, and in those instances in which the acquisition is a purchase, a purchase price. The identifications of the provider and product may comprise any identifiers uniquely associated with the provider and product, respectively. Those having ordinary skill in the art will appreciate that a greater or lesser number of acquisition-related variables may be used as determined by the type of acquisition being undertaken. Optionally, at block 212, payment information may be sent to the one or more shareholders in those instances in which the acquisition is a purchase of goods. The payment information may comprise credit card or account information, as known in the art. A more detailed embodiment relating to the acquisition of goods if further described below with reference to FIG. 3. In general, anonymity throughout the acquisition is preserved by virtue of the fact that the entity's identification is preserved as a shared secret among the plurality of shareholders.

Assuming that the entity has previously engaged in a variety of transactions based on the previously-distributed secret shares, the entity may be able to obtain recommendations regarding, for example, potential future acquisitions. As described in further detail in U.S. patent application Ser. No. 09/976,637 ("the '637 application") and U.S. patent application Ser. No. 10/098,261 ("the '261 application"), recommendations may be provided in an anonymous fashion where "activities" (e.g., acquisitions of goods) previously engaged in by an entity have been associated with a plurality of secret shares. An estimate of the activities previously engaged in by an entity (i.e., a profile of the entity) can be calculated as an intersection of those activities associated with each of the secret shares for the entity. Based on such estimated activities, recommendations may be provided. To this end, at block 214, a recommendation request may be sent by the entity to one or more of the shareholders. In response to the recommendation request, the entity receives recommendations from the one or more shareholders.

Finally, at block 216, a voucher verification request may be sent by the entity to one or more shareholders. As described in U.S. patent application Ser. No. 10/099,446 ("the '446 application"), a voucher verification request comprises information identifying at least one usage right to be verified relative to a given entity as determined by the entity's identification. As further described in the '446 application, a voucher comprises a listing of one or more usage rights available to a holder (i.e., an entity) of a digital product or the like. Usage rights encompass substantially all actions that the entity may take relative to a digital product with the permission of the provider of the digital product. Vouchers or usage rights corresponding to a given entity are associated with at least the secret share possessed by each shareholder corresponding to the entity. An estimate of available usage rights is determined by calculating the intersection of those usage rights associated with each of the secret shares for the entity. Based on the estimated availability of usage rights, the availability of the subject usage rights may be confirmed or denied. Thus, in response to the voucher verification request, the entity receives a confirmation or denial of the subject usage rights.

Figure 3:
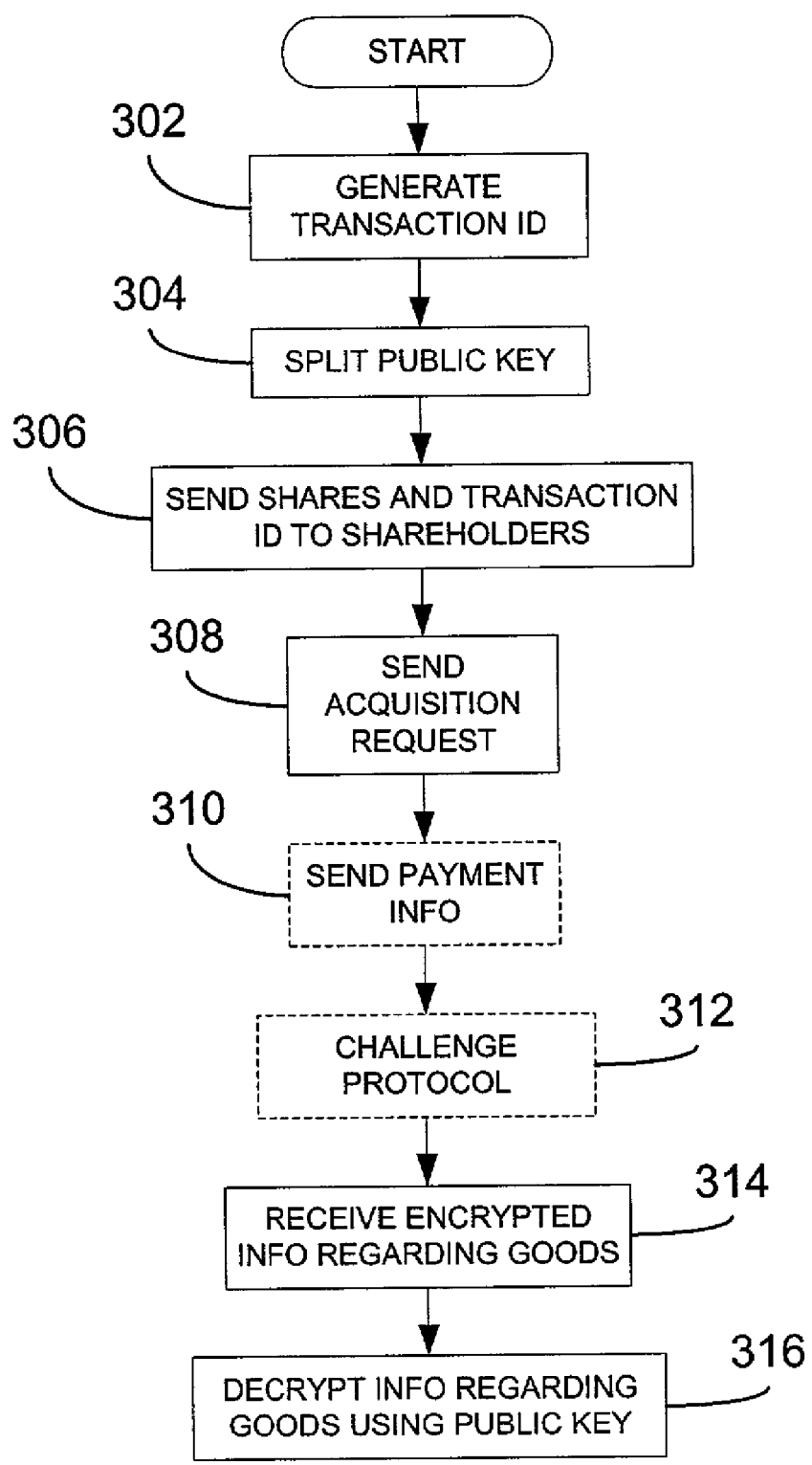
FIGS. 3–5 are flow charts illustrating methods for an entity in accordance with other embodiments of the present invention.
Figure 4:
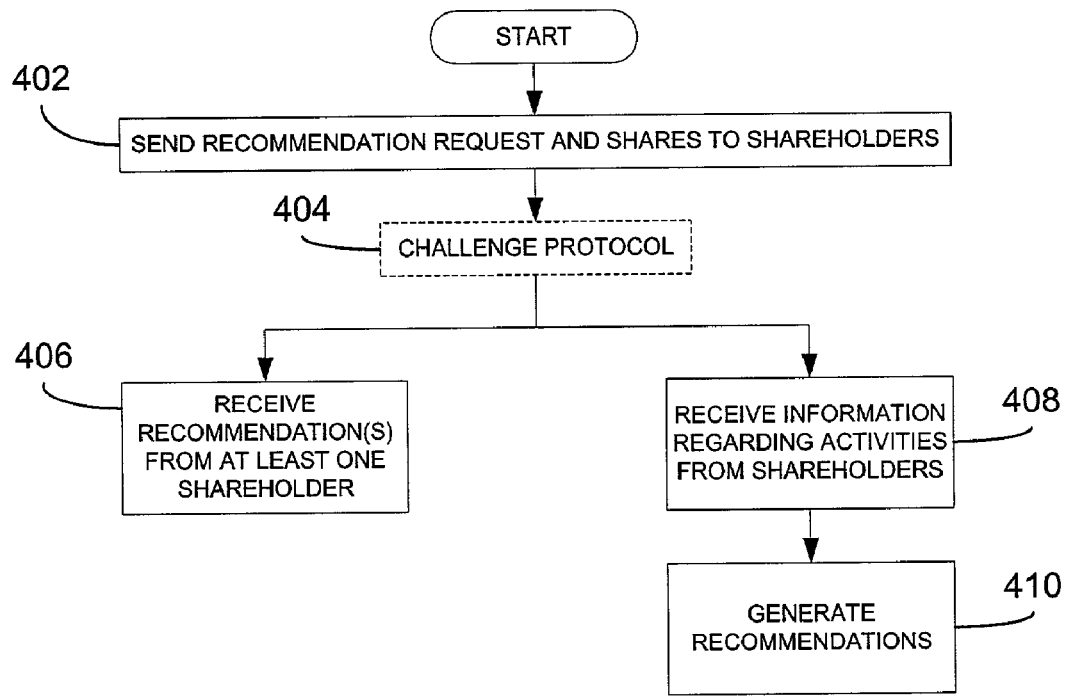
Figure 5:
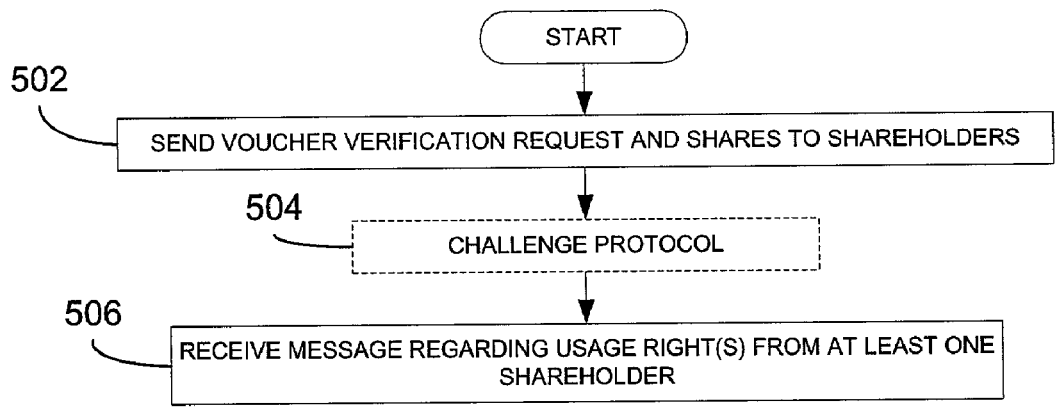

FIGS. 3–5 illustrate more detailed embodiments of the various transactions that an entity can engage in once it has established secret shares representative of its identity with a plurality of shareholders. Referring now to FIG. 3, a more detailed process whereby an entity can engage in an acquisition of goods is illustrated, in particular, an acquisition of goods based on the use of a public key. The functionality shown in FIG. 3 is preferably implemented using stored software algorithms and the like operating, when necessary, in conjunction with necessary hardware, for example, data input/output interfaces. At block 302, the entity generates a transaction identification as previously described. The transaction identification is generated in response to detecting that the entity is to engage in an acquisition of goods.

At block 304, the entity causes a public key corresponding to the entity to be split into a plurality of secret shares using the splitting techniques previously described. Note that an entity may have more than one public key associated therewith. As such, the entity may have to first select a particular public key to use. Recall that public keys may be used not only for the purpose of cryptographic processing, but also for identification purposes. Thereafter, at block 306, the transaction identification and the secret shares are sent to a plurality of shareholders, where the transaction identification is associatively stored with each secret share by the corresponding shareholder.

At block 308, the entity sends an acquisition request, as described above, to one or more of the plurality of shareholders. In one embodiment of the present invention, one of the plurality of shareholders may be designated as a primary shareholder to act as an interface between the shareholders and the entity. In this case, no shareholder other than the primary shareholder communicates directly with the entity. The designation of the primary shareholder may be predetermined by the entity, in which case the acquisition request may include messaging instructing the recipient of the acquisition request that it is to be the primary shareholder. In this scenario, in order to maximize security, each shareholder, beginning with the primary shareholder, is preferably instructed of only one other shareholder to whom it is to send its output. In an alternative embodiment, the acquisition request may be sent to more than one shareholder with instructions for each shareholder to negotiate with at least some of the other shareholders to determine which shareholder is to be designated as the primary shareholder. Thereafter, identification of the selected primary shareholder would be communicated to the entity for future use. Those having ordinary skill in the art will recognize that other methods of selecting a primary shareholder could be devised, and that the present invention is not limited in this regard. Optionally, at block 310, payment information may be sent by the entity to the one or more shareholders in the case of a purchase of goods.

In order to maintain security, it is understood that a protocol to verify the propriety of the public keys must be used. Currently, public keys are often verified through the use of so-called digital certificates, as described above. However, it is obvious that such a verification scheme cannot be used in the context of the present invention as it would necessarily require one or more of the shareholders to learn the actually identity of the entity providing the public key (or, more accurately stated, shares thereof). To this end, a certificate provider, e.g., certificate provider 110 in FIG. 1, may be employed to verify the public key shares on behalf of the shareholders. An embodiment of this type is further described with reference to FIG. 6.

Figure 7:
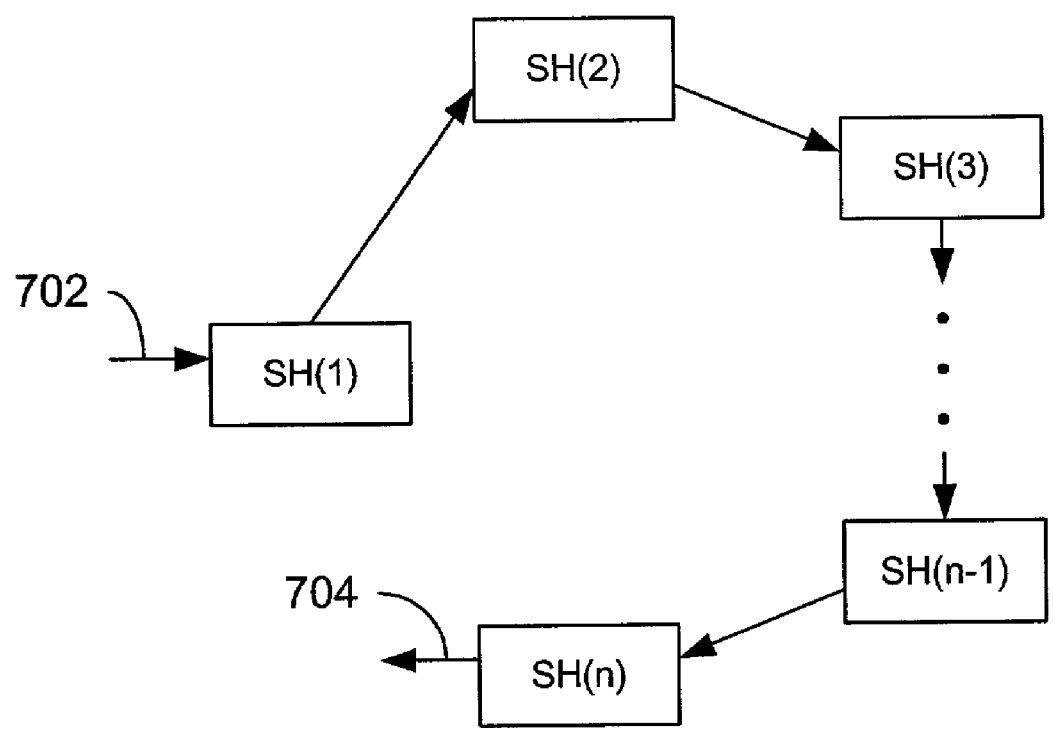
FIG. 7 is a block diagram schematically illustrating distributed processing in accordance with an embodiment of the present invention.

In another embodiment, a challenge request is provided by the shareholders to the entity, which challenge request allows the entity to verify that it is the source of the public key. In particular, after the shareholders have received their corresponding shares of the public key, a primary or first shareholder initiates a challenge protocol by encrypting challenge data based on its portion of the public key and raising it to the required power (per Eq. 4 above) to provide an encrypted information portion. Preferably, the challenge data comprises random data generated by the first or primary shareholder. Thereafter, it can pass its encrypted information portion to another of the shareholders which further encrypts the challenge data based on its portion. In this case, the second shareholder combines its encrypted information portion with that received from the primary or first shareholder, and the resulting encrypted information portion is sent to yet another shareholder. This process is then repeated until every shareholder has had the opportunity to contribute to the encryption of the challenge data based on its portion of the public key. Assuming the public key possesses the property illustrated by Eq. 3 above, the resulting encrypted challenge data should be equivalent to encryption of the challenge data by the public key directly. This process is generally illustrated in FIG. 7 where input data 702 is operated upon by a first or primary shareholder, SH(1). The resultant output provided to a chain of n–1 other shareholders, as shown, such that operation upon the intermediate data by the n'th shareholder, SH(n), results in output data 704 that is equivalent to processing by the public key directly upon the input data 702. Of course, if the shareholders are known to each other in a way that allows such a chain to be formed, this can allow them to collaborate to reveal the secrets they are holding. To overcome this issue, the output of each shareholder's operation may be provided to the entity to complete the operation. Alternatively, the entity itself could be designated as one of the shareholders, i.e., the primary shareholder, such that knowledge of the other shareholders is already inherent.

Thereafter, the encrypted challenge data is provided to the entity which thereafter decrypts the encrypted challenge data based on the public key presumably in its possession. The resulting decrypted challenge data is thereafter provided back to the primary or first shareholder for comparison with the original challenge data. If the decrypted challenge data and the original challenge data match, it may be presumed that the entity did in fact provide the secret shares to the shareholders and is in fact the legitimate holder of the public key. In effect, a challenge protocol of this type helps ensure that an adverse party does not attempt to fool the shareholders by claiming to be the holder of the public key.

Regardless of the type of challenge protocol used, processing continues at block 314, the entity receives encrypted information regarding the goods from the one or more shareholders. As used herein, the phrase "encrypted information regarding the goods" encompasses a broad range of potential data that allows the entity to obtain the desired goods either directly or indirectly. At one extreme, the encrypted information regarding the goods comprises the goods themselves after having been encrypted by the entity's public key in the fashion described above and illustrated in FIG. 7. This would be the case, for example, where the goods comprise downloadable software or other information that may be directly used (e.g., executed) by the entity. At the other extreme, the encrypted information regarding the goods may comprise information that instructs or allows the entity to access the goods via another communication channel. For example, where the goods comprise a service or access to a database, the encrypted information regarding the goods may comprise an encryption key or password that has itself been encrypted using the entity's public key in the distributed fashion described above. The encryption key, when decrypted using the entity's public key, thereafter allows the entity to decrypt an asset that the entity obtains elsewhere (e.g., a floppy disk or compact disc) or, in the case of a password, allows the entity to access a secure site or execute password protected software.

Regardless of the particular format or content of the encrypted information regarding the goods, the entity decrypts the information at block 316 based on the entity's private key. Depending on the type of data included in the encrypted information regarding the goods, the resulting decrypted data either places the entity in direct possession of the desired goods or allows the entity to obtain the desired goods, as described above.

Referring now to FIGS. 4 and 5, there are illustrated, respectively, procedures whereby an entity may seek to obtain recommendations or to verify usage rights. As FIGS. 4 and 5 demonstrate, recommendations and/or voucher verifications may be requested by an entity at any time after the entity has established, with a plurality of shareholders, a plurality of secret shares representative of its identity. Referring now to FIG. 4, in the case of obtaining recommendations, processing begins at block 402 where the entity formulates and sends a recommendation request and secret shares to the plurality of shareholders. The secret shares are generated at block 402 in the same manner as previously described, i.e., by splitting the entity's identification. Because the splitting process is preferably repeatable such that equivalent inputs yield equivalent outputs, the secret shares generated at block 402 are equivalent to the secret shares previously generated by the entity, assuming the same entity identification is used as input. By providing the secret shares to the shareholders along with the recommendation request, the shareholders can identify those activities associated with its corresponding secret share for us in generating a profile of the entity. The recommendation request instructs the shareholders to either directly generate the recommendations themselves or to provide the entity with sufficient information (i.e., the activities associated with each shareholder's share) as to allow entity to generate recommendations itself through the creation of a profile. Once again, the concepts of a predetermined primary shareholder or a negotiated primary shareholder may be employed when providing the recommendation request and the secret shares to the shareholders.

At block 404, the entity may be optionally engaged in a challenge protocol as previously described to ensure the legitimacy of the secret shares provided at block 402. Assuming that the challenge protocol is successfully completed, one of two alternatives for receiving recommendations may occur. In the first, as illustrated by block 406, the entity receives one or more recommendations from the one or more shareholders. In this scenario, the shareholders themselves are responsible for determining the intersection of the activities associated with each shareholder's secret share. To this end, using the configuration illustrated in FIG. 7 for example, each shareholder in the chain calculates the intersection of the activities associated with its secret share with the results provided by the previous shareholder and provides its results to the next shareholder. In this manner, the output of the last shareholder will represent a profile of the activities associated with the entity. Based on this profile, any one of the shareholders can generate recommendations using known comparison techniques, which recommendations are thereafter provided to the entity at block 406.

In the second of the two alternatives, each shareholder, upon receiving the recommendation request and its corresponding secret share, can respond by sending the information regarding the activities associated with its secret share to the entity at block 408. The entity thereafter calculates, at block 310, the intersection itself to provide the necessary profile and, subsequently, the desired recommendations. Note that this approach requires the entity to have access to a database of potential goods to compare against the profile.

Using a similar approach as that used to obtain recommendations, the entity can obtain verification of the availability of one or more usage rights relative to goods already in its possession. This might be done, for example, after an entity has acquired the goods using the procedure described above relative to FIG. 3. Thus, at block 502, the entity formulates and sends a voucher verification request and the plurality of secret shares to corresponding ones of the shareholders. The secret shares are once again generated in the same manner used to generate the secret shares for each previous transaction. The voucher verification request comprises information identifying at least one usage right to be verified relative to the entity as collectively determined by the secret shares. It is anticipated that, in some circumstances, a party other than the entity itself could act as a source of a verification request. For example, in order to confirm the occurrence of a spurious usage right in favor of an entity, law enforcement or an authorized audit agency may request verification of usage rights. In those instances, the other party generating the request will need to have knowledge of the shareholders used by the entity as well as the entity's private key if it needs to satisfy the challenge protocol.

As in all instances in which shareholders receive secret shares from the entity, the entity may be optionally engaged in a challenge protocol, at block 504, by the shareholders to ensure the legitimacy of the secret shares provided at block 502. Assuming that the challenge protocol is completed successfully, processing continues at block 506 where the entity receives a message from the one or more shareholders regarding the usage right(s) referred to in the voucher verification request. The message indicates whether the requested usage right(s) is available. In contrast to the recommendation technique described above relative to FIG. 4, the voucher verification request cannot be completed by the entity in those cases in which the entity is the party seeking verification of usage rights. Thus, the shareholders themselves are responsible for determining the intersection of the usage rights associated with each shareholder's secret share. To this end, using the configuration illustrated in FIG. 7 for example, each shareholder in the chain calculates the intersection of the usage rights associated with its secret share with the results provided by the previous shareholder and provides its results to the next shareholder. In this manner, the output of the last shareholder will represent an estimate of the usage rights available to the entity. Based on this estimate, any one of the shareholders can provide the message to the entity indicating whether the requested usage right(s) is available.

Figure 6:
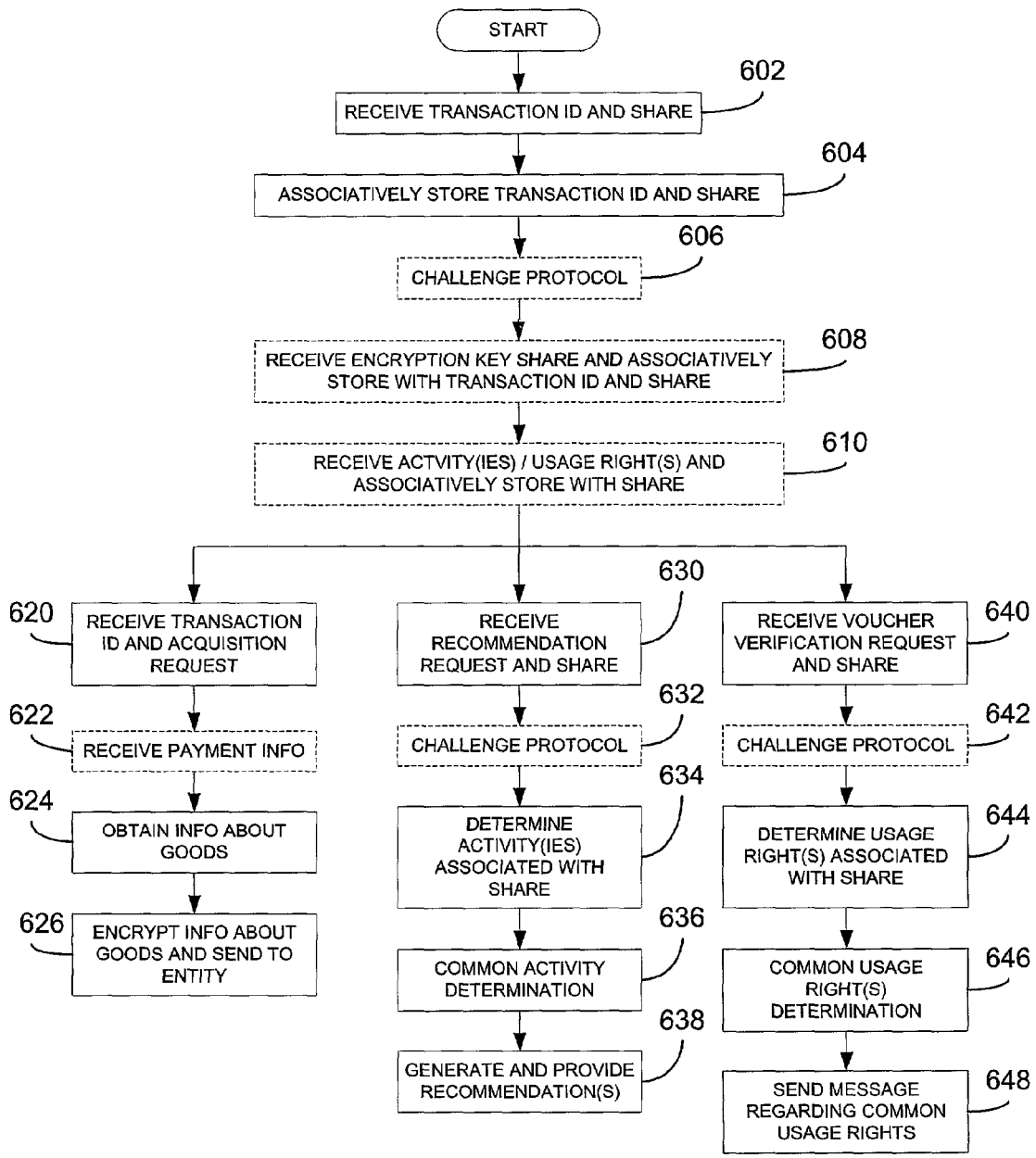
FIG. 6 is a flow chart illustrating a method for a shareholder in accordance with an embodiment of the present invention.

Referring now to FIG. 6, a flowchart illustrating operation of shareholders in accordance with an embodiment of the present invention is provided. Except as noted, the process illustrated in FIG. 6 is preferably carried out by each shareholder using stored software routines executed on an appropriate processing platform. Some processing illustrated in FIG. 6, rather than being carried out by each shareholder, is instead carried out by only a subset or single one of the plurality of shareholders. Thus, beginning at block 602, each shareholder receives a transaction identification and a secret share, as previously described, from an entity. Once again, each secret share received at block 602 is representative of an entity identification corresponding to the sending entity. Thereafter, at block 604, each shareholder associatively stores the transaction identification and the secret share. Note that each shareholder may receive secret shares from a variety of entities, some of which secret shares may actually have equivalent values.

At block 606, each shareholder may optionally participate in a challenge protocol, as described above, to verify the legitimacy of the secret share received from the entity. In an alternate embodiment, particularly applicable to the case in which the entity identification is a public key assigned to the entity, the shareholders may engage the services of a certificate provider, e.g., the certificate provider 112 shown in FIG. 1, to verify the secret shares. To this end, upon receiving the transaction identification and its respective secret share, each shareholder sends the transaction identification and its secret share to the certificate provider. Upon reconstructing the public key based on the secret shares as instructed and verifying that the public key legitimately belongs to the entity, the certificate provider can reply to the shareholders with a message indicating that the secret shares in their collective possession related to the transaction identification are indeed legitimate. In this manner, the shareholder can verify their secret shares without learning the identification (i.e., the public key) of the entity.

In the event that the entity identification is separate from an encryption key to be used by each shareholder on the entity's behalf, the processing of block 608 may be performed in which each shareholder receives an encryption key secret share from the entity. Once again, the nature of each share is such that the corresponding shareholder is not able to reconstruct the encryption key based on the share that it receives. In order to allow for distributed encryption/decryption using, for example, a configuration like that depicted in FIG. 7, the encryption key split by the entity should adhere to the property described above relative to Eq. 3. Based on the transaction identification that is preferably sent with each encryption key share, each shareholder associatively stores its received encryption key share with the transaction identification and the previously received secret share representative of the entity identification.

Continuing at block 610, each shareholder may receive information indicative of one or more activities engaged in by the entity along with the secret share already in the shareholder's possession. For example, in one embodiment of the present invention, each time an entity engages in an acquisition of goods, information regarding that activity is provided to the shareholders. Based on the secret share, the shareholder associatively stores the information indicative of the one or more activities with the secret share. As described in U.S. patent application Ser. No. 09/976,637 and U.S. patent application Ser. No. 10/098,261, incorporated by reference above, each secret share held by a given shareholder may have, and in fact preferably has, information regarding the activities of multiple entities associated therewith. In this manner, anonymity with regard to the activities engaged in by individual entities is protected.

In addition to, or as an alternative to, the information regarding an entity's activities, individual shareholders may also receive, at block 610, information regarding usage rights (i.e., vouchers) from providers that have provided goods to the entity. This would occur, for example, where an entity has completed an acquisition of goods from the provider. Again, using the transaction identification provided with such information, the shareholders are able to associatively store the information regarding the usage rights with their corresponding secret shares.

At this point, the shareholders may be called upon to assist in the further acquisition of goods, the provision of recommendations or the verification of usage rights. Referring now to block 620, this first option is considered when one or more of the shareholders receives a transaction identification and an acquisition request from the entity. The transaction identification received at block 620 may be identical to one received at block 602 such that the shareholder knows which secret share in its possession is to be used in fulfilling the acquisition request. As noted previously, the acquisition request comprises information sufficient to enable the one or more shareholders to fulfill the request, i.e., identification of the goods and corresponding provider, etc. Optionally, at block 622, payment information may be received by the one or more shareholders where the acquisition is a purchase. Thereafter, at block 624, a first or primary shareholder, with the cooperation of other shareholders, obtains information regarding the goods. As previously described, the information regarding the goods may comprise the goods themselves, or may comprise information that allows the entity to access or otherwise obtain the goods itself. A first or primary shareholder would obtain such information from a content provider by informing the content provider of the transaction, providing payment to the content provider for the transaction if necessary, and obtaining either an encryption key or access code and/or a URL or other location or the encrypted file for the asset. This may be done through the use of an intermediary clearing house if necessary.

Thereafter, at block 626, each shareholder contributes to the encryption of the information about the goods based on each secret share and a distributed encryption scheme like that described above relative to FIG. 7. The output of the cumulative encryption process is encrypted information regarding the goods that is thereafter provided to the entity.

In support of providing recommendations, the processing illustrated by blocks 630–638 may be performed the shareholders. At block 630, each of the shareholders receives, from an entity, a recommendation request and a secret share, which secret share presumably matches a secret share previously provided by the entity to the shareholder. Optionally, at block 632, each shareholder may participate in a challenge protocol, for example, like those previously described. If a challenge protocol is not used, or if it is successfully completed, processing continues at block 634 where each shareholder determines the one or more activities associated with its respective secret share. Thereafter, at block 636, each shareholder contributes to the determination of activities that are common across each of the shareholders' list of activities. As previously described, this can be done by having the shareholders progressively determine the intersections of each shareholder's list of activities with the lists of activities provided by the other shareholders. In this manner, the shareholders are able to generate a profile of the activities engaged in by the entity. Alternatively, each shareholder could provide its respective list of activities to the requesting entity, which entity thereafter calculates the intersection of the sets. Assuming that the shareholders determine the desired profile in a progressive fashion, processing continues at block 638 where one of the shareholders generates one or more recommendations based on the profile, as known in the art.

Finally, the shareholders may be called upon to assist in the verification of usage rights as depicted by blocks 640–648. At block 640, each of the shareholders receives, from an entity, a voucher verification request and a secret share, which secret share presumably matches a secret share previously provided by the entity to the shareholder. Optionally, at block 642, each shareholder may participate in a challenge protocol, as described above. If a challenge protocol is not used, or if it is successfully completed, processing continues at block 644 where each shareholder determines the one or more usage rights associated with its respective secret share. Thereafter, at block 646, each shareholder contributes to the determination of usage rights that are common across each of the shareholders' list of usage rights. Once again, this can be done by having the shareholders progressively determine the intersections of each shareholder's list of usage rights with the lists of usage rights provided by the other shareholders. In this manner, the shareholders are able to generate a list of usage rights available to the entity. Processing continues at block 648 where one of the shareholders compares the requested usage right(s) against the generated list of available usage rights. Thereafter, the shareholder sends a message regarding the availability of the requested usage right(s) to the requesting entity.

The present invention provides a technique for conducting anonymous transactions in an e-commerce environment. To this end, an entity operating in accordance with the present invention provides transaction identifications and secret shares to a plurality of shareholders, which secret shares are representative of an identification of the entity. Based on these secret shares, the shareholders facilitate various transactions on the entity's behalf, such as the acquisition of goods, the provision of recommendations and/or the verification of usage rights. In this manner, the present invention avoids the need for a centralized anonymity service.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Furthermore, the present invention has been described in terms of single transactions. However, it need not be so limited and could be expanded to handle multiple transactions. For example, where an entity seeks to purchase multiple electronic books from an on-line provider in a single transaction, the acquiring entity could split the multiple products (the electronic books) into separate transactions as described above. The splitting of a single transaction comprising multiple items into multiple transactions each comprising a single item also offers a solution to those instances in which one of the items is not available. Without splitting such a single transaction/multiple item request into separate transactions, the unavailability of one of the items would result in the acquiring entity having been approved for more than necessary.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for an entity to support anonymous transactions, the method comprising:
   generating a transaction identification that does not uniquely identify the entity;
   splitting an entity identification uniquely associated with the entity into a plurality of secret shares; and
   sending the transaction identification and the plurality of secret shares to a plurality of shareholders
   wherein an encryption scheme in which the encryption key is used has a property that encrypted data resulting from encryption of data based on the encryption key is equivalent to a product of encrypted data portions based on the plurality of entity encryption key shares, wherein each encrypted data portion results from encryption of the data based on one of the plurality of entity encryption key shares.

2. The method of claim 1, further comprising: splitting an encryption key associated with the entity into a plurality of entity encryption key shares; and sending the plurality of entity encryption key shares to the plurality of shareholders.

3. The method of claim 2, wherein the entity identification and the encryption key are the same.

4. The method of claim 3, wherein the entity identification is a public key uniquely associated with the entity.

5. The method of claim 1, wherein the entity identification is a linear combination of the plurality of entity identification secret shares.

6. The method of claim 1, further comprising: sending an acquisition request and the transaction identification to at least one shareholder of the plurality of shareholders.

7. The method of claim 6, further comprising: sending payment information and the transaction identification to the at least one shareholder.

8. The method of claim 1, further comprising: sending a recommendation request and the plurality of secret shares to corresponding ones of the plurality of shareholders.

9. The method of claim 1, further comprising: sending a voucher verification request and the plurality of secret shares to corresponding ones of the plurality of shareholders.

10. A method for an entity to support anonymous acquisitions, the method comprising:
    generating a transaction identification that does not uniquely identify the entity; distributing a public key, in the form of secret shares, and the transaction identification to a plurality of shareholders;
    sending an acquisition request regarding goods to be acquired and the transaction identification to at least one shareholder of the plurality of shareholders;
    receiving, based on the transaction identification, encrypted information from at least one shareholder of the plurality of shareholders, wherein the encrypted information comprises information regarding the goods and is encrypted, at least in part, by the plurality of shareholders based on each of the secret shares; and
    decrypting the encrypted information based on the public key,
    wherein receiving the encrypted information further comprises receiving, from at least one shareholder of the plurality of shareholders, encrypted information portions, wherein each encrypted information portion results from encryption of the information regarding the goods based on at least one of the secret shares, the method further comprising: calculating the product of the encrypted information portions to provide the encrypted information.

11. The method of claim 10, wherein the encrypted information is progressively encrypted by the plurality of shareholders based on each of the secret shares.

12. The method of claim 10, wherein the encrypted information comprises the goods.

13. The method of claim 10, wherein the encrypted information comprises an encryption key needed to access the goods.

14. The method of claim 10, further comprising: sending payment information and the transaction identification to the at least one shareholder.

15. The method of claim 10, further comprising: receiving, responsive to the acquisition request, recommendations from the at least one shareholder.

16. A method for an entity to support anonymous acquisitions, comprising:
    generating a transaction identification that does not uniquely identify the entity; distributing a public key, in the form of secret shares, and the transaction identification to a plurality of shareholders;
    sending an acquisition request regarding goods to be acquired and the transaction identification to at least one shareholder of the plurality of shareholders;
    receiving, based on the transaction identification, encrypted information from at least one shareholder of the plurality of shareholders, wherein the encrypted information comprises information regarding the goods and is encrypted, at least in part, by the plurality of shareholders based on each of the secret shares; and
    prior to receiving the encrypted information:
      receiving a challenge request from a shareholder of the plurality of shareholders, the challenge request comprising encrypted challenge data;
      decrypting the encrypted challenge data based on the public key to provide decrypted challenge data; and
      sending the decrypted challenge data to the shareholder.

17. A method for an entity to support anonymous acquisitions, comprising:
    generating a transaction identification that does not uniquely identify the entity; distributing a public key, in the form of secret shares, and the transaction identification to a plurality of shareholders;
    sending an acquisition request regarding goods to be acquired and the transaction identification to at least one shareholder of the plurality of shareholders;
    receiving, based on the transaction identification, encrypted information from at least one shareholder of the plurality of shareholders, wherein the encrypted information comprises information regarding the goods and is encrypted, at least in part, by the plurality of shareholders based on each of the secret shares;
    sending, to the plurality of shareholders, a voucher verification request regarding at least one usage right and the secret shares, wherein each shareholder of the plurality of shareholders has previously associated at least one usage right corresponding to the entity with the secret share maintained by the shareholder; and receiving, from at least one shareholder of the plurality of shareholders, a message indicating that at least some of the at least one usage right is available to the entity.

18. A method for a shareholder of a plurality of shareholders, in communication with an entity, to support anonymous transactions, the method comprising:
receiving a secret share and a transaction identification from the entity, wherein the secret share is one of a plurality of secret shares representative of an entity identification corresponding to the entity, and
wherein the transaction identification does not uniquely identify the entity;
associatively storing the secret share and the transaction identification;
receiving the transaction identification and an acquisition request regarding goods from the entity;
receiving, based on the acquisition request and the transaction identification, information regarding the goods; and
encrypting the information regarding the goods based on the secret share to provide an encrypted information portion
receiving information based on at least one other encrypted information portion from another shareholder of the plurality of shareholders; and combining the encrypted information portion with the information based on the at least one other encrypted information portion to provide an updated encrypted information portion.

19. The method of claim 18, further comprising: receiving an entity encryption key share from the entity, wherein the entity encryption key share is one of a plurality of entity encryption key shares representative of an encryption key associated with the entity; and associatively storing the entity encryption key share with the secret share and the transaction identification.

20. The method of claim 18, wherein the entity identification comprises a public key uniquely associated with the entity.

21. The method of claim 18, further comprising: sending the encrypted information portion to the entity.

22. The method of claim 18, further comprising: sending the updated encrypted information portion to yet another shareholder of the plurality of shareholders when the shareholder is not a last shareholder of the plurality of shareholders.

23. The method of claim 18, further comprising: sending the updated encrypted information portion to the entity when the shareholder is a last shareholder of the plurality of shareholders.

24. The method of claim 18, further comprising: receiving payment information and the transaction identification from the entity.

25. The method of claim 18, further comprising: receiving a recommendation request and the secret share from the entity, wherein the shareholder has previously associated at least one activity corresponding to the entity with the secret share; and determining, based on the recommendation request, the at least one activity.

26. The method of claim 25, further comprising: sending the at least one activity to another shareholder of the plurality of shareholders.

27. The method of claim 25, further comprising: sending the at least one activity to the entity.

28. The method of claim 18, further comprising:
receiving a voucher verification request regarding at least one requested usage right and the secret share from the entity, wherein the shareholder has previously associated at least one usage right corresponding to the entity with the secret share; and
determining, based on the voucher verification request, the at least one usage right.

29. The method of claim 28, further comprising: sending the at least one usage right to another shareholder of the plurality of shareholders.

30. The method of claim 28, further comprising: sending the at least one usage right to the entity.

31. A method for a shareholder of a plurality of shareholders, in communication with an entity, to support anonymous transactions, comprising:
receiving a secret share and a transaction identification from the entity, wherein the secret share is one of a plurality of secret shares representative of an entity identification corresponding to the entity, and
wherein the transaction identification does not uniquely identify the entity;
associatively storing the secret share and the transaction identification;
receiving a recommendation request and the secret share from the entity, wherein the shareholder has previously associated at least one activity corresponding to the entity with the secret share; and determining, based on the recommendation request, the at least one activity;
receiving, from another shareholder of the plurality of shareholders, at least one additional activity;
determining common activities between the at least one activity and the at least one additional activity; and
when the shareholder is not a last shareholder of the plurality of shareholders, sending the common activities to yet another shareholder.

32. A method for a shareholder of a plurality of shareholders, in communication with an entity, to support anonymous transactions, comprising:
receiving a secret share and a transaction identification from the entity, wherein the secret share is one of a plurality of secret shares representative of an entity identification corresponding to the entity, and
wherein the transaction identification does not uniquely identify the entity;
associatively storing the secret share and the transaction identification;
receiving a recommendation request and the secret share from the entity, wherein the shareholder has previously associated at least one activity corresponding to the entity with the secret share; and determining, based on the recommendation request, the at least one activity;
receiving, from another shareholder of the plurality of shareholders, at least one additional activity;
determining common activities between the at least one activity and the at least one additional activity;
when the shareholder is a last shareholder of the plurality of shareholders, generating a set of recommendations based on the common activities; and providing the set of recommendations to the entity.

33. A method for a shareholder of a plurality of shareholders, in communication with an entity, to support anonymous transactions, comprising:
receiving a secret share and a transaction identification from the entity, wherein the secret share is one of a plurality of secret shares representative of an entity identification corresponding to the entity, and wherein the transaction identification does not uniquely identify the entity;

associatively storing the secret share and the transaction identification;

receiving a voucher verification request regarding at least one requested usage right and the secret share from the entity, wherein the shareholder has previously associated at least one usage right corresponding to the entity with the secret share; and determining, based on the voucher verification request, the at least one usage right;

receiving, from another shareholder of the plurality of shareholders, at least one additional usage right;

determining common usage rights between the at least one usage right and the at least one additional usage right; and when the shareholder is not a last shareholder of the plurality of shareholders, sending the common usage rights to yet another shareholder.

34. A method for a shareholder of a plurality of shareholders, in communication with an entity, to support anonymous transactions, comprising:

receiving a secret share and a transaction identification from the entity, wherein the secret share is one of a plurality of secret shares representative of an entity identification corresponding to the entity, and wherein the transaction identification does not uniquely identify the entity;

associatively storing the secret share and the transaction identification;

receiving a voucher verification request regarding at least one requested usage right and the secret share from the entity, wherein the shareholder has previously associated at least one usage right corresponding to the entity with the secret share; and determining, based on the voucher verification request, the at least one usage right;

receiving, from another shareholder of the plurality of shareholders, at least one additional usage right;

determining common usage rights between the at least one usage right and the at least one additional usage right;

when the shareholder is a last shareholder of the plurality of shareholders, determining whether the at least one requested usage right matches the common usage rights; and sending a message indicating the availability of the at least one requested usage right to the entity when the at least one requested usage right matches the common usage rights.

35. An apparatus for supporting anonymous transactions by an entity comprising:

means for generating a transaction identification that does not uniquely identify the entity;

means for splitting an entity identification uniquely associated with the entity into a plurality of secret shares; and means, coupled to the means for generating and the means for splitting, for sending the transaction identification and the plurality of secret shares to a plurality of shareholders, wherein the entity identification and the encryption key are the same, and wherein the means for splitting the entity identification comprise the means for spitting the encryption key.

36. The apparatus of claim 35, further comprising: means, coupled to the means for sending, for splitting an encryption key associated with the entity into a plurality of entity encryption key shares, wherein the means for sending further function to send the plurality of entity encryption key shares to the plurality of shareholders.

37. The apparatus of claim 35, wherein the entity identification is a public key uniquely associated with the entity.

38. The apparatus of claim 35, further comprising: means for sending an acquisition request and the transaction identification to at least one shareholder of the plurality of shareholders.

39. The apparatus of claim 38, wherein the means for sending the acquisition request further function to send payment information and the transaction identification to the at least one shareholder.

40. The apparatus of claim 35, further comprising: means for sending a recommendation request and the plurality of secret shares to corresponding ones of the plurality of shareholders.

41. The method of claim 35, further comprising: means for sending a voucher verification request and the plurality of secret shares to corresponding ones of the plurality of shareholders.

42. An apparatus for supporting anonymous acquisitions by an entity comprising:

means for generating a transaction identification that does not uniquely identify the entity;

means, coupled to the means for generating, for distributing a public key, in the form of secret shares, and the transaction identification to a plurality of shareholders;

means, coupled to the means for generating, for sending an acquisition request regarding goods to be acquired and the transaction identification to at least one shareholder of the plurality of shareholders; and means for receiving, based on the transaction identification, encrypted information from at least one shareholder of the plurality of shareholders, wherein the encrypted information comprises information regarding the goods and is encrypted, at least in part, by the plurality of shareholders based on each of the secret shares; and means, coupled to the means for receiving, for decrypting the encrypted information based on the public key, wherein the means for receiving further function to receive, from at least one shareholder of the plurality of shareholders, encrypted information portions, wherein each encrypted information portion results from encryption of the information regarding the goods based on at least one of the secret shares, and wherein the apparatus further comprises: means, coupled to the means for receiving, for calculating the product of the encrypted information portions to provide the encrypted information.

43. The apparatus of claim 42, wherein the means for sending the acquisition request further function to send payment information and the transaction identification to the at least one shareholder.

44. An apparatus for supporting anonymous acquisitions by an entity comprising:

means for generating a transaction identification that does not uniquely identify the entity;

means, coupled to the means for generating, for distributing a public key, in the form of secret shares, and the transaction identification to a plurality of shareholders;

means, coupled to the means for generating, for sending an acquisition request regarding goods to be acquired and the transaction identification to at least one shareholder of the plurality of shareholders; and means for receiving, based on the transaction identification, encrypted information from at least one shareholder of the plurality of shareholders, wherein the encrypted information comprises information regarding the goods and is encrypted, at least in part, by the plurality of shareholders based on each of the secret shares; and means, coupled to the means for receiving, for decrypting the encrypted information based on the public key, means for receiving, prior to receiving the encrypted information, a challenge request from a shareholder of the plurality of shareholders, the challenge request comprising encrypted challenge data; means, coupled to the means for receiving the challenge request, for decrypting the encrypted challenge data based on the public key to provide decrypted challenge data; and means, coupled to the means for decrypting, for sending the decrypted challenge data to the shareholder.

45. An apparatus for supporting anonymous acquisitions by an entity, comprising:

means for generating a transaction identification that does not uniquely identify the entity;

means, coupled to the means for generating, for distributing a public key, in the form of secret shares, and the transaction identification to a plurality of shareholders;

means, coupled to the means for generating, for sending an acquisition request regarding goods to be acquired and the transaction identification to at least one shareholder of the plurality of shareholders;

means for receiving, based on the transaction identification, encrypted information from at least one shareholder of the plurality of shareholders, wherein the encrypted information comprises information regarding the goods and is encrypted, at least in part, by the plurality of shareholders based on each of the secret shares; and means, coupled to the means for receiving, for decrypting the encrypted information based on the public key; and means for sending a voucher verification request regarding at least one usage right and the secret shares to the plurality of shareholders, wherein each shareholder of the plurality of shareholders has previously associated at least one usage right corresponding to the entity with the secret share maintained by the shareholder; and means for receiving, from at least one shareholder of the plurality of shareholders, a message indicating that at least some of the at least one usage right is available to the entity.

46. An apparatus by which a shareholder of a plurality of shareholders can supporting anonymous transactions by an entity, wherein the shareholder is in communication with the entity, comprising:

means for receiving a secret share and a transaction identification from the entity, wherein the secret share is one of a plurality of secret shares representative of an entity identification corresponding to the entity, and wherein the transaction identification does not uniquely identify the entity;

means, coupled to the means for receiving, for associatively storing the secret share and the transaction identifications;

means for receiving the transaction identification and an acquisition request regarding goods from the entity;

means for receiving information regarding the goods, wherein the information regarding the goods is provided based on the acquisition request and the transaction identification;

means for encrypting the information regarding the goods based on the secret share to provide an encrypted information portion;

means for receiving, from another shareholder of the plurality of shareholders, information based on at least one other encrypted information portion; and means for combining the encrypted information portion with the information based on the at least one other encrypted information portion to provide an updated encrypted information portion; and means for sending the updated encrypted information portion to yet another shareholder of the plurality of shareholders when the shareholder is not a last shareholder of the plurality of shareholders.

47. The apparatus of claim 46, further comprising: means for receiving an entity encryption key share from the entity, wherein the entity encryption key share is one of a plurality of entity encryption key shares representative of an encryption key associated with the entity; and means for associatively storing the entity encryption key share with the secret share and the transaction identification.

48. The apparatus of claim 46, further comprising: means for sending the encrypted information portion to the entity.

49. The apparatus of claim 46, further comprising: means for sending the updated encrypted information portion to the entity when the shareholder is a last shareholder of the plurality of shareholders.

50. The apparatus of claim 46, further comprising: means for receiving payment information and the transaction identification from the entity.

51. The apparatus of claim 46, further comprising: means for receiving a recommendation request and the secret share from the entity, wherein the shareholder has previously associated at least one activity corresponding to the entity with the secret share; and means for determining, based on the recommendation request, the at least one activity.

52. The apparatus of claim 51, further comprising: means for sending the at least one activity to another shareholder of the plurality of shareholders.

53. The apparatus of claim 51, further comprising: sending the at least one activity to the entity.

54. The apparatus of claim 51, further comprising:

means for receiving, from another shareholder of the plurality of shareholders, at least one additional activity;

means for determining common activities between the at least one activity and the at least one additional activity;

means for generating a set of recommendations based on the common activities when the shareholder is a last shareholder of the plurality of shareholders; and means for providing the set of recommendations to the entity.

55. The apparatus of claim 46, further comprising: means for receiving a voucher verification request regarding at least one requested usage right and the secret share from the entity, wherein the shareholder has previously associated at least one usage right corresponding to the entity with the secret share; and means for determining, based on the voucher verification request, the at least one usage right.

56. The apparatus of claim 55, further comprising: means for sending the at least one usage right to another shareholder of the plurality of shareholders.

57. The apparatus of claim 55, further comprising: means for sending the at least one usage right to the entity.

58. The apparatus of claim 55, further comprising: means for receiving, from another shareholder of the plurality of shareholders, at least one additional usage right; means for determining common usage rights between the at least one usage right and the at least one additional usage right; and means for sending the common usage rights to yet another shareholder when the shareholder is not a last shareholder of the plurality of shareholders.

59. An apparatus by which a shareholder of a plurality of shareholders can supporting anonymous transactions by an entity, wherein the shareholder is in communication with the entity, comprising:

means for receiving a secret share and a transaction identification from the entity, wherein the secret share is one of a plurality of secret shares representative of an entity identification corresponding to the entity, and wherein the transaction identification does not uniquely identify the entity; and means, coupled to the means for receiving, for associatively storing the secret share and the transaction identification;

means for receiving a recommendation request and the secret share from the entity, wherein the shareholder has previously associated at least one activity corresponding to the entity with the secret share; and means for determining, based on the recommendation request, the at least one activity;

means for receiving, from another shareholder of the plurality of shareholders, at least one additional activity;

means for determining common activities between the at least one activity and the at least one additional activity; and means for sending the common activities to yet another shareholder when the shareholder is not a last shareholder of the plurality of shareholders.

60. An apparatus by which a shareholder of a plurality of shareholders can supporting anonymous transactions by an entity, wherein the shareholder is in communication with the entity, comprising:

means for receiving a secret share and a transaction identification from the entity, wherein the secret share is one of a plurality of secret shares representative of an entity identification corresponding to the entity, and wherein the transaction identification does not uniquely identify the entity;

means, coupled to the means for receiving, for associatively storing the secret share and the transaction identification;

means for receiving a voucher verification request regarding at least one requested usage right and the secret share from the entity, wherein the shareholder has previously associated at least one usage right corresponding to the entity with the secret share; and means for determining, based on the voucher verification request, the at least one usage right;

means for receiving, from another shareholder of the plurality of shareholders, at least one additional usage right; means for determining common usage rights between the at least one usage right and the at least one additional usage right;

means for determining whether the at least one requested usage right matches the common usage rights when the shareholder is a last shareholder of the plurality of shareholders; and means for sending a message indicating the availability of the at least one requested usage right to the entity when the at least one requested usage right matches the common usage rights.

* * * * *